Sept. 15, 1942.   C. W. LANTER   2,295,742
BALE
Filed May 8, 1939   2 Sheets-Sheet 1
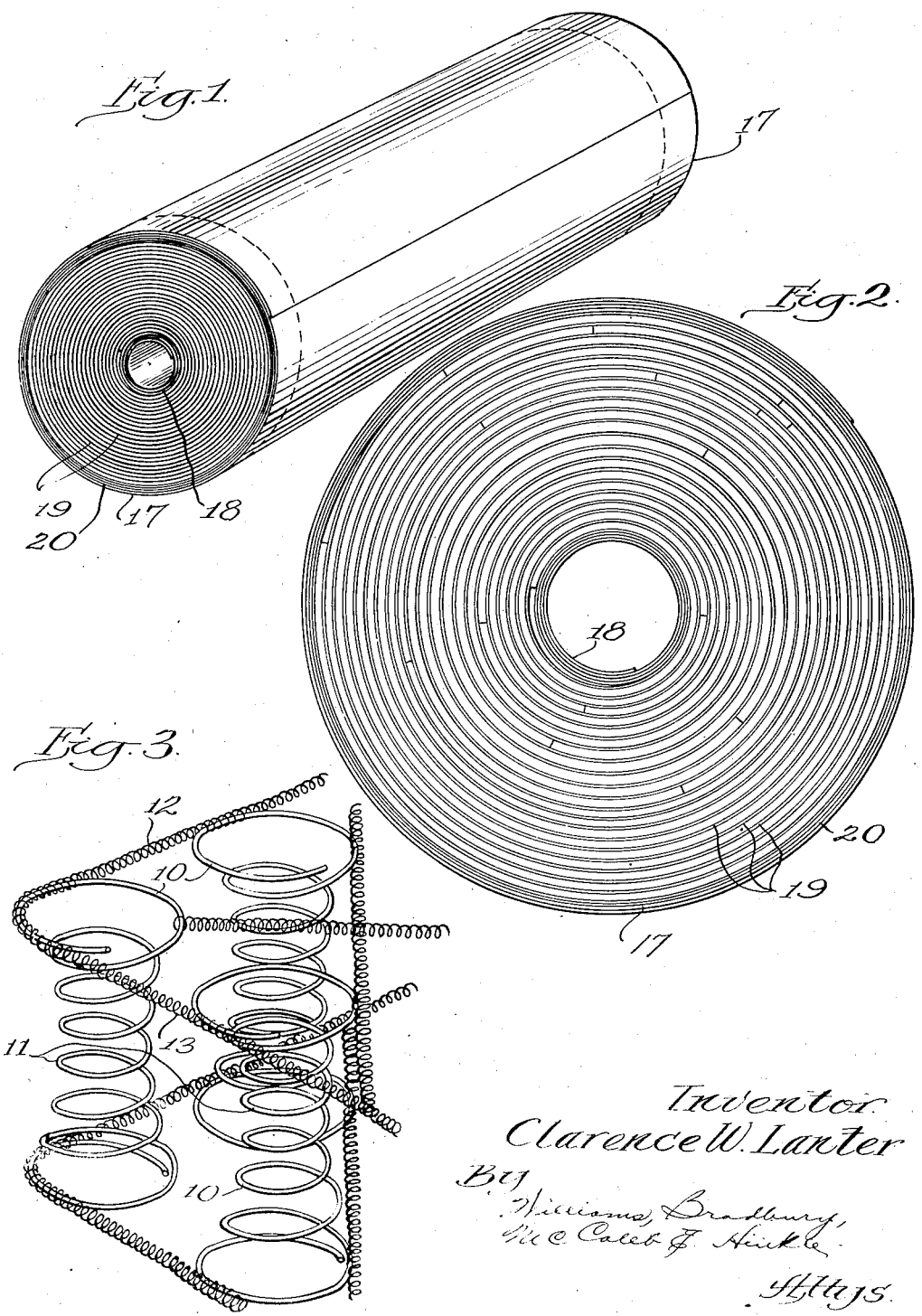
Inventor
Clarence W. Lanter Sept. 15, 1942. C. W. LANTER 2,295,742
BALE
Filed May 8, 1939 2 Sheets-Sheet 2
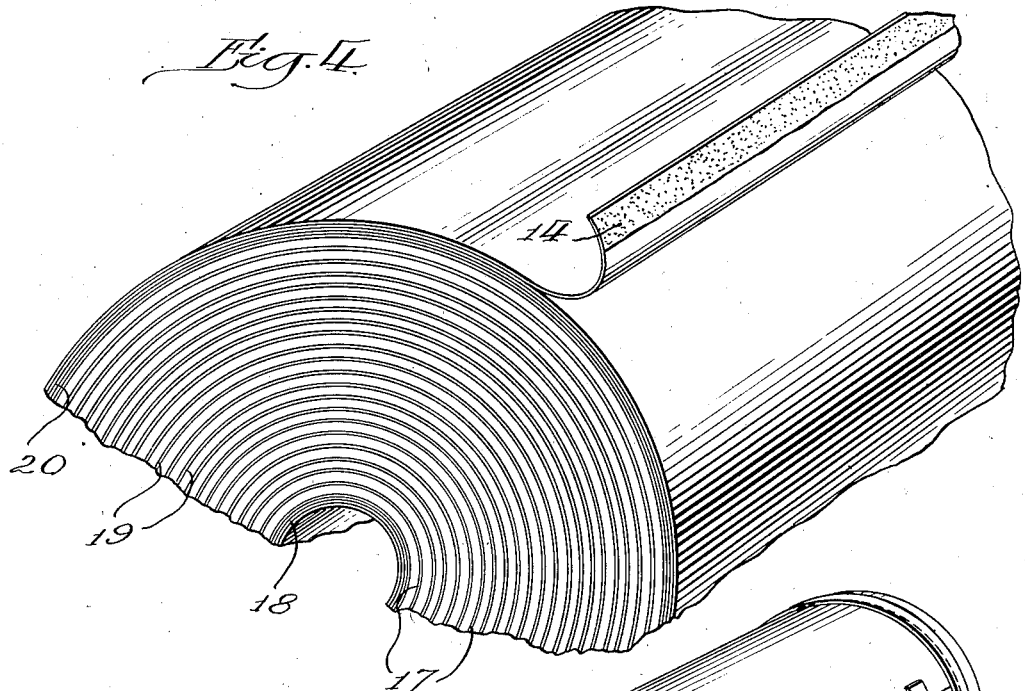
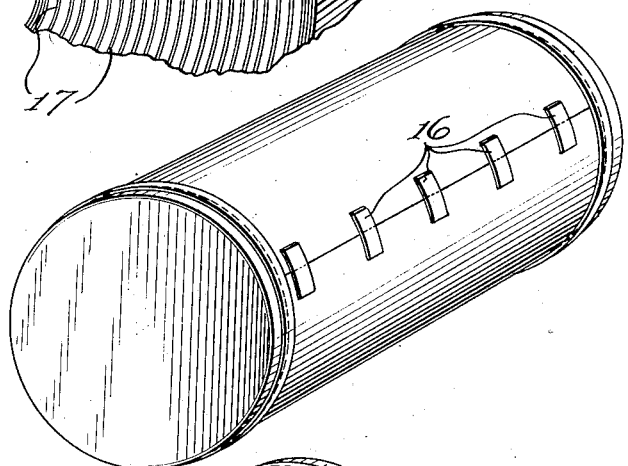
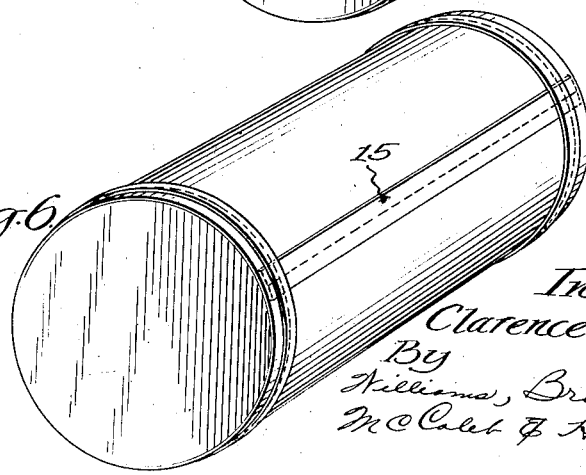

Patented Sept. 15, 1942

2,295,742

UNITED STATES PATENT OFFICE 2,295,742

BALE

Clarence W. Lanter, Chicago, Ill.

Application May 8, 1939, Serial No. 272,345

12 Claims. (Cl. 206—46)

The present invention relates to bales, and is particularly concerned with bales adapted to be used for spring units, covered and uncovered, of the type which are utilized in making springs and mattresses.

In some embodiments of the invention the bale may also be used for complete mattresses, cushions, or the like, and for other compressible raw material, merchandise, etc.

The present application is a continuation-in-part of my prior applications, Ser. No. 549,399, Method of baling, filed July 8, 1931, which issued May 9, 1939, U. S. Patent No. 2,157,765; and my prior application, Ser. No. 428,287, Baling machines, filed February 14, 1930, which issued January 22, 1935, U. S. Patent No. 1,988,692.

The present application relates particularly to improved forms of bales adapted to be made according to the method of baling covered by my Patent No. 2,157,765 and by the machines disclosed in both patents.

One of the objects of the invention is the provision of an improved bale for spring units or other merchandise, which is adapted to be handled more conveniently in the shipment of the merchandise, and also in the unbaling of the spring units.

Another object of the invention is the provision of an improved bale by means of which the spring units may be compressed to a fraction of their original size, with the springs in substantially axial alignment and without distortion of the springs, so that the spring units may be shipped at a lower cost and so that they may occupy a much smaller space for shipment and storage.

Another object of the invention is the provision of an improved bale which is economical, sturdy, and which preserves the spring unit or mattresses in better condition for a longer period of time than the devices of the prior art.

Another object of the invention is the provision of an improved bale which is adapted to be stored, and from which one or more spring units may be removed as desired, without completely unbaling the spring units or merchandise, and without possibility of damage due to the release of the energy stored by the compression of the springs, as is the case with some of the prior art devices.

Another object of the invention is the provision of an improved bale structure which eliminates all of the disadvantages of the bales of the prior art for spring units or mattresses, in which the bales were compressed into a flat package and bound, which necessarily involved the release of all of the spring units from the bale at the same time.

Other objects and advantages of the invention will be apparent from the following description and the accompanying drawings, in which similar characters of reference indicate similar parts throughout the several views.

Referring to the drawings,

Fig. 1 is a view in perspective of a completed bale embodying the invention, and made by the machines and methods of my prior patents;

Fig. 2 is an end plan view of one of the bales;

Fig. 3 is a fragmentary view in perspective of one type of spring unit adapted to be baled according to the present methods;

Fig. 4 is a fragmentary perspective, showing the edge of the paper bent back for the gluing operation;

Figs. 5 and 6 are small views in perspective, showing alternative forms of methods of gluing the loose edge of the paper wrapping.

As the machines for making such bales are fully described in my two parent applications, which have issued as the above-mentioned patents, and as the method is also fully described in said patents, I shall merely refer briefly to the machine and method herein and the disclosures of my two prior Patents Nos. 1,988,692 and 2,157,765 are hereby incorporated by reference thereto, for the purpose of disclosing fully the machines and methods for making the present bales.

The machine in question is provided with a system of belts and with a drum so arranged that a pair of belts, rollers, or other devices gradually compress the spring units axially and thereafter wrap the spring units upon the drum, with or without intervening paper, burlap, or other wrapping, and maintain the compression of the spring units while they are being wrapped spirally upon a drum. Thereafter the completed bale is provided with a covering for maintaining the compression, and thus the spring units or other merchandise are maintained in spirally wrapped condition, with the springs or merchandise compressed to a fraction of their normal size.

The method may be described in some detail as involving the supporting and advancing of the spring units, gradually compressing the units as they advance to a predetermined thickness and state of compression, and maintaining this thickness and compression while wrapping the unit in successive spiral turns on a supporting member, The radial compression of the innermost spiral turns is maintained by means of the outer spiral turns, which are wrapped upon them.

Referring to the present drawings,

Fig. 3 shows a spring unit of the type adapted to be baled, and it comprises a plurality of springs 10 of the type having helical turns diminishing in diameter toward the point 11 and increasing in diameter toward both ends of the spring.

The springs 10 are preferably secured together by means of the interlocking spiral, longitudinally and transversely extending helical springs 12 and 13 above and below and at other convenient points, and in some embodiments of the invention there may be flat border wires utilized for securing the springs 10 together in such manner that the springs 10 are located in rows longitudinally and transversely of the unit and regularly spaced from each other.

In some embodiments of the invention the entire spring unit may be covered by burlap or other fiber, and in some other embodiments of the invention each of the springs 10 may be enclosed in a small burlap or fabric compartment of its own.

Various other types of merchandise may be baled and included in a bale of the same construction, such as, for example, finished mattresses, which would be compressed to a lesser degree, various types of fiber, mineral, vegetable, and animal sheet material, cushions, pillows, clothing, paper rags, leather, raw materials of various kinds, food materials, etc.

Where the spring units are entirely uncovered with fabric or other material, as shown in Fig. 3, it is desirable to utilize a spiral layer of fabric, such as, for example, burlap or paper, such as a heavy and tough, but cheap, wrapping paper, in between the spring units. This layer prevents the entangling of the layers of springs and respective units as they engage each other in the spiral wrapping.

In the preferred form of the invention a heavy, tough wrapping paper, which is still flexible, but stiff enough to protect the edges of the bale, is utilized throughout the bale, not only for the spiral division partition between the spring units, but for the final outer wrapping. For this purpose the paper, in a long strip and coming from a suitable roll, is fed into the machine and rolled on a drum of suitable size. For example, the drum in one embodiment of the invention is approximately seven inches in diameter, and the paper is about fifty-two inches wide, which is two inches wider than the spring units which are baled.

The drum may be of greater length, for the purpose of baling units of various sizes, as the smaller sizes may be baled upon machines having a longer drum and wider bales.

The paper is preferably fed into the machine so that it will be wrapped in a direction opposite to the way in which it is wrapped upon its commercial roll, as this is conducive to the best operation of the machine.

The end of the paper is preferably provided with a layer of tacky glue, across from one side to the other; and although some of the glue may get upon the belt, the glued end will be torn loose from the belt at the proper point, and will engage the next wrapping of paper and aid in the formation of a relatively stiff cylindrical member on the inside of the bale.

In some embodiments of the invention this gluing of the inner end may be eliminated. The paper is preferably wrapped around the drum a plurality of times, such as, for example, two or three or four, or even six or ten times, if desired, to provide the central, relatively stiff cylindrical core for the bale, after the bale has been removed from the drum. Thereafter the spring units are fed into the machine with the paper, and they may be fed either above or below the paper, but are preferably above, as this permits the best view of the spring units as they are being fed into the machine.

The two belts described in my prior patents gradually compress the spring units to a fraction of their normal size, and thereafter maintain the compression while the spring units are being wrapped on the drum, one after another, with the spiral partition or layer of paper in between the spiral layers of spring units.

Such a bale may include but one spring unit, if desired, which may occupy several turns about the drum, or it may include from fifteen to twenty spring units. For example, twenty spring units may be included when they are made of relatively light wire and when the spring units include the heavier wire, or a border wire, a bale may include, for example, fifteen spring units.

Any number of spring units may be included in the bale, from one to a multiplicity, depending on the size of the shipment, the size of the bale desired, the weight, and other characteristics. Such a bale, including fifteen heavy spring units or twenty light spring units, may be, for example, twenty-five or twenty-six inches in diameter when finished.

When the desired number of spring units has been compressed and wrapped spirally on the drum, in between the paper layer, the bale is finished by continuing the wrapping of paper without spring units, from one to a multiplicity of additional spiral turns of paper. For example, three or four extra spiral wrappings of paper will provide the outer surface of the bale with a relatively tough and stiff outer covering that will protect the spring units against anything which might happen to them in transit or storage.

When a sufficient number of extra turns of paper have been wrapped on the bale, the paper is cut off and the final edge is turned upward and back, as shown in Fig. 4, so that glue may be applied to the upper surface of the fold 14 by means of a brush. Then this fold is turned downward again, and the paper is fed on into the machine.

Naturally, some glue from the surface 14 may get on the belt, and the paper may stick to the lowermost belt temporarily, but when it comes to the final wrapping of that part of the paper, the glue which is still tacky will loosen from the belt and the surface 14 will be pressed down against the adjacent paper surface to secure the wrapping tightly on the bale.

The extra glue will be squeezed out and the edge surface of the paper pressed tightly against the adjacent wrapping of paper, so that no further attention is required to secure the wrapping on the bale.

The bale may then be removed from the machine by sliding it axially off the drum, as described in my prior patents.

In other embodiments of the invention a long strip 15 of glued paper may be attached to the end of the paper wrapping in such manner that it overlaps and engages the next adjacent underwrapping of paper and secures the end of the paper.

In another modification of the invention a plurality of glued strips 16 may be used. In each of the latter cases the glued strips may be secured to the end of the paper in proper manner before it goes into the machine, and all of this may be done by the operator while the machine is operating at its regular speed before the paper gets into the machine.

The paper which is used is preferably wider than the spring units. For example, if the spring units in the bale occupy 50 inches of the width of the paper, this will leave one inch of paper projecting beyond the spring units or other wrapped merchandise in the finished bale.

The finished bale, therefore, includes the axially projecting edges of the paper at each end, as indicated at 17, for the protection of the springs or other merchandise. This is shown in Figs. 1 and 2. For example, the paper wrapping includes the inner cylindrical portion 18, having a plurality of turns of paper tightly and spirally wrapped to form a cylindrical tube which forms a core for the bale. Thereafter, the paper of the bale includes the spiral wrappings 19, which are, for example, one-half inch apart, and which continue from the inner cylindrical core 18 to the outer cylindrical covering 20 in one continuous strip of paper.

The outer cylindrical covering 20 includes a plurality of spiral wrappings of the same paper, and the end is secured by gluing or other suitable means to the paper of the wrapping, which lies under the end.

In some embodiments of the invention the ends of the bale might also be covered or protected by a layer of cardboard or a cap of cardboard glued on each end of the bale; but in the preferred embodiment of the invention no extra covering for the ends is required.

The projecting edges 17 protect the springs and effectively space the springs from all other engaging articles. The bales may be stood on end, and the spirally projecting paper flange 17 is of sufficient strength to support it.

In the use of the spring units after the bale has been stored or shipped, it is only necessary to lay the cylindrical bale down upon the floor or some other support and hold it with one hand while cutting through the outermost layer of paper with a knife or other sharp instrument. If the knife cuts through more than one layer, no harm is done, but it is only necessary to cut through the outermost layer. Thereafter the bale will tend to unroll after the first few outer layers of paper have been unrolled, and it is necessary to hold the bale down with the hands during the unrolling.

The expansion of the springs at the point where the spring units are actually unrolling from the bale tends to cause the bale to unroll, and one or more spring units may be unrolled from the bale, as desired.

The unrolling may be stopped by placing the bale against the wall, or a block, or some other obstruction located on the side toward which the bale tends to unroll; or, if desired, encompassing strings or ropes or glue may be used for holding the partially unwrapped bale in rolled condition.

Unlike the flat compressed baled spring units, which all become unbaled at once, the present bale may have its spring units or merchandise taken off as desired, while maintaining the baled condition of all the rest of the merchandise. The friction between the spring units and the paper and between the layers of paper at the innermost cylindrical core and the outer cover aids in holding the merchandise in baled condition, and only a slight amount of force is necessary to keep the bale from unwrapping, after it has been opened, or while it is still glued.

It is because of this frictional action between the respective layers that the immense amount of energy which is stored in the compressed springs can be held in place merely by gluing the end of the paper.

In some embodiments of the invention a burlap wrapping might be used instead of the paper, for the purpose of saving the paper, as such spring units are generally used with a burlap covering anyhow, and the burlap used for wrapping the spring units might thereafter be used for covering the spring units. Thus there would be a complete saving of the paper by utilizing the same burlap for wrapping, which is later to be used for constructing covered spring units.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A bale of spring units for mattresses and the like, comprising a plurality of separate spring units, said units being wrapped in compressed condition end to end to form a spiral roll of disconnected units and a continuous flexible wrapper arranged between each layer and extending from the innermost to the outermost units and wrapped there-around for maintaining the compression and position of the outermost units, the balance of said units being held against release by frictional engagement with each other through the wrapper and by the outermost units.

2. An improved bale for merchandise, comprising an inner substantially cylindrical core, and a plurality of spiral wrappings of the merchandise under compression, and an outer cylindrical covering for said merchandise, for the purpose of maintaining the merchandise in a state of compression and spirally wrapped condition, said inner core and outer covering being constructed of paper, said bale having a spirally wrapped layer of paper interposed between the spirally wrapped layers of merchandise, said core covering and spirally wrapped paper layer being in the form of a continuous strip of paper.

3. An improved bale for merchandise, comprising an inner substantially cylindrical core, and a plurality of spiral wrappings of the merchandise under compression, and an outer cylindrical covering for said merchandise, for the purpose of maintaining the merchandise in a state of compression and spirally wrapped condition, said inner core and outer covering being constructed of paper, said bale having a spirally wrapped layer of paper interposed between the spirally wrapped layers of merchandise, said paper strip protruding beyond the merchandise in the bale at each end of the bale for protecting the merchandise in the bale.

4. In a bale for spring units, the combination of an inner core comprising a plurality of spirally wrapped layers of paper forming a substantially cylindrical body with a plurality of spirally wrapped layers of spring units upon said core, said spring units being compressed to a fraction of their normal thickness, and an outer covering of paper comprising a plurality of spirally wrapped layers of paper, maintaining the compression of said spring units and the spiral wrapping thereof, said outer covering having its outermost edge secured in place by adhesive.

5. In a bale for spring units, the combination of an inner core comprising a plurality of spirally wrapped layers of paper forming a substantially cylindrical body with a plurality of spirally wrapped layers of spring units upon said core, said spring units being compressed to a fraction of their normal thickness, and an outer covering of paper comprising a plurality of spirally wrapped layers of paper, maintaining the compression of said spring units and the spiral wrapping thereof, said outer covering having its outermost edge secured in place by adhesive, and a layer of paper interposed between the respective layers of the spiral spring units, for the purpose of preventing the entanglement of the springs of one layer with those of another layer.

6. In a bale for spring units, the combination of an inner core comprising a plurality of spirally wrapped layers of paper with a plurality of spirally wrapped layers of spring units upon said core, said spring units being compressed to a fraction of their normal thickness, and an outer covering of paper comprising a plurality of spirally wrapped layers of paper, maintaining the compression of said spring units and the spiral wrapping thereof, said outer covering having its outermost edge secured in place by adhesive, and a layer of paper interposed between the respective layers of the spiral spring units, for the purpose of preventing the entanglement of the springs of one layer with those of another layer, said inner core, outer covering, and paper layer being in the form of a continuous strip of paper.

7. In a bale for spring units, the combination of an inner core comprising a plurality of spirally wrapped layers of paper with a plurality of spirally wrapped layers of spring units upon said core, said spring units being compressed to a fraction of their normal thickness, and an outer covering of paper comprising a plurality of spirally wrapped layers of paper, maintaining the compression of said spring units and the spiral wrapping thereof, said outer covering having its outermost edge secured in place by adhesive, and a layer of paper interposed between the respective layers of the spiral spring units, for the purpose of preventing the entanglement of the springs of one layer with those of another layer, said inner core, outer covering, and paper layer being in the form of a continuous strip of paper, and said strip of paper projecting axially from each end of the bale beyond the spring units, for the purpose of protecting the spring units at each end.

8. An improved bale of resilient spring units of the type having a plurality of spirally wound springs secured together with their axes in substantial parallelism, comprising a plurality of separate spring units, said spring units having their main springs compressed to a fraction of the normal expanded length, and said spring units being wrapped spirally and continuously, end to end in a spiral roll with a layer of flexible material interposed between the spiral layers which comprise said spring units and separating the layers of spring units from each other from the innermost to the outermost spring units, the compression of the innermost spring units being maintained by the location of outer spring units about them and by the tension of outer spring units, and a covering of flexible material wrapped around the outermost spirally wrapped spring units, and having its free end secured for the purpose of maintaining the compression and wrapping of the spring units in a substantially cylindrical bale.

9. A bale for resilient spring units of the type having a plurality of spirally wound springs secured together with their axes in substantial parallelism, comprising a plurality of separate spring units, said spring units having their main springs compressed until the coils of the springs are substantially side by side, and said spring units being wrapped spirally and continuously under compression end to end in a spiral roll between a spiral sheet of flexible material, the compression of the innermost spring units being maintained by the outer spring units extending about them and by said flexible material, said flexible material having its free end secured to an adjacent wrapping of the same material for the purpose of maintaining the compression and wrapping of the spring units in a substantially cylindrical bale.

10. A bale for resilient spring units of the type having a plurality of spirally wound springs secured together with their axes in substantial parallelism, comprising a plurality of separate spring units, said spring units having their main springs compressed until the coils of the springs are substantially side by side, and said spring units being wrapped spirally and continuously under compression end to end in a spiral roll between a spiral sheet of flexible material, the compression of the innermost spring units being maintained by the outer spring units extending about them and by said flexible material, said flexible material having its free end secured to an adjacent wrapping of the same material for the purpose of maintaining the compression and wrapping of the spring units in a substantially cylindrical bale, said bale having a centrally located core formed of a plurality of spiral wrappings of said flexible material for withstanding the compression of the innermost coils of spring units.

11. A bale for resilient spring units of the type having a plurality of spirally wound springs secured together with their axes in substantial parallelism, comprising a plurality of separate spring units, said spring units having their main springs compressed until the coils of the springs are substantially side by side, and said spring units being wrapped spirally and continuously under compression end to end in a spiral roll between a spiral sheet of flexible material, the compression of the innermost spring units being maintained by the outer spring units extending about them and by said flexible material, said flexible material having its free end secured to an adjacent wrapping of the same material for the purpose of maintaining the compression and wrapping of the spring units in a substantially cylindrical bale, said flexible material comprising relatively heavy tough paper and said bale having a plurality of spiral wrappings of said paper, one upon the other, at its outer surface to provide a protective housing.

12. A bale for resilient spring units of the type having a plurality of spirally wound springs secured together with their axes in substantial parallelism, comprising a plurality of separate spring units, said spring units having their main springs compressed until the coils of the springs are substantially side by side, and said spring units being wrapped spirally and continuously under compression end to end in a spiral roll between a spiral sheet of flexible material, the compression of the innermost spring units being maintained by the outer spring units extending about them and by said flexible material, said flexible material having its free end secured to an adjacent wrapping of the same material for the purpose of maintaining the compression and wrapping of the spring units in a substantially cylindrical bale, the said flexible material projecting beyond the spring units at each end of said bale for the purpose of protecting the edges of the spring units.

CLARENCE W. LANTER.